March 14, 1961  W. A. PLATT  2,974,908
CLOSED LOOP RATIO CHANGER AND AUTOMATIC TRIM COMPUTER
MEANS FOR CONTROLLING THE POSITION OF
AN AIRCRAFT CONTROL SURFACE
Filed April 3, 1957

INVENTOR.
WALTER A. PLATT
BY
ATTORNEY

United States Patent Office 2,974,908
Patented Mar. 14, 1961

2,974,908

CLOSED LOOP RATIO CHANGER AND AUTOMATIC TRIM COMPUTER MEANS FOR CONTROLLING THE POSITION OF AN AIRCRAFT CONTROL SURFACE

Walter A. Platt, Paterson, N.J., assignor to The Bendix Corporation, a corporation of Delaware Filed Apr. 3, 1957, Ser. No. 650,535

8 Claims. (Cl. 244—77)

The present invention relates to a closed loop ratio changer and automatic trim computer and more particularly to a system adapted for use in conjunction with a mechanical ratio changer and a trim actuator or servo for the purpose of automatically trimming the elevator of an aircraft so as to maintain the ratio of maximum elevator control stick travel to the load factor of the aircraft substantially constant.

An object of the invention is to provide novel means to limit the pilot's control of the elevators by adjustment of a ratio changer in the system.

Another object of the invention is to provide the pilot with constant stick sensitivity in terms of normal acceleration per stick deflection.

Another object of the invention is to provide novel means for automatically trimming the elevators of the airplane to one "G" flight conditions through operation of an accelerometer and trim actuator controlled thereby.

Another object of the invention is to provide means to effect the amount of trim necessary to correct for changes in the steady state characteristics of the plane, such as changes in airspeed, altitude, gross weight and shift in the center of gravity of the plane as upon consumption of fuel in the flight thereof.

Another object of the invention is to provide a normal accelerometer arranged on the plane so as to sense any change in "G" due to any of the above effects and so arranged as to generate an electrical signal which causes an automatic trim actuator to move the surfaces of the elevators in a proper sence to restore the plane to the desired one "G" flight condition.

Another object of the invention is to provide a signal generator so arranged as to cooperate in computing the proper position of the ratio changer in response to the displacement of a trim actuator and in which arrangement the operation of the trim actuator and signal from the generator in turn reflects the setting of the control stick in relation to the normal acceleration of the aircraft and such signal is compared to a simple corrective signal effected as a function of Mach number and altitude sensed by a suitable control device so that the resultant signal causes the ratio changer servo to position the ratio changer linkage to the proper value.

Another object of the invention is to provide a signal generator means so arranged in the system that the pilot may command a maneuver of the airplane without upsetting the proper operation of the trim actuator. Thus, for a condition where the airplane is in a maneuver, the input signal from the signal generator on the control stick will balance and cancel the signal from the accelerometer allowing the trim actuator to stay at the position that it had prior to the initiation of the maneuver.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
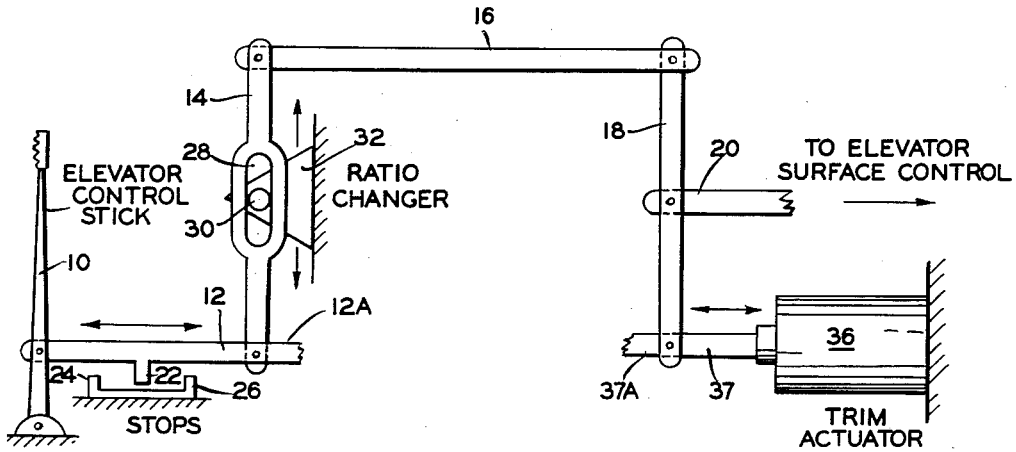
Figure 1 is a diagrammatic showing of the mechanical arrangement of the ratio changer and trim actuator in the control linkage.

Referring to the drawing of Figure 1 there is indicated by the numeral 10 a pilot's elevator control lever operatively connected through linkage 12, 14, 16, 18 and 20 to the elevator control surface actuating means. The linkage 12 has an element 22 arranged to engage stops 24 and 26 at the extreme limits of movement thereof while linkage 14 has a slot 28 in which is slidably mounted a pin 30 adjustably positioned therein by a ratio changer 32 operated by an actuator servo 34, as shown schematically in Figure 2.

Thus, upon adjustment of the ratio changer 32 by the actuator 34, the ratio of movement of the elevator surface to movement of the control stick 10 may be varied, as hereinafter explained, with varying sensed conditions so that the maximum control stick 10 displacement from neutral will give sufficient mechanical linkage displacement at the output 16 of the ratio changer 32 at any flight condition to cause the airplane to perform a limit load factor maneuver.

The linkage 18, as shown diagrammatically in Figure 1, is arranged so as to be operatively positioned by a trim actuator 36 operatively connected thereto by a link 37. The trim actuator 36 is controlled by a computed electrical signal so that it adds sufficient mechanical displacement into the linkage 18 so as to position the elevator control surface through linkage 20 to trim the aircraft at a load factor equal to 1 G, at any flight condition without the necessity of any substantial control stick 10 displacement from neutral.

Figure 2:
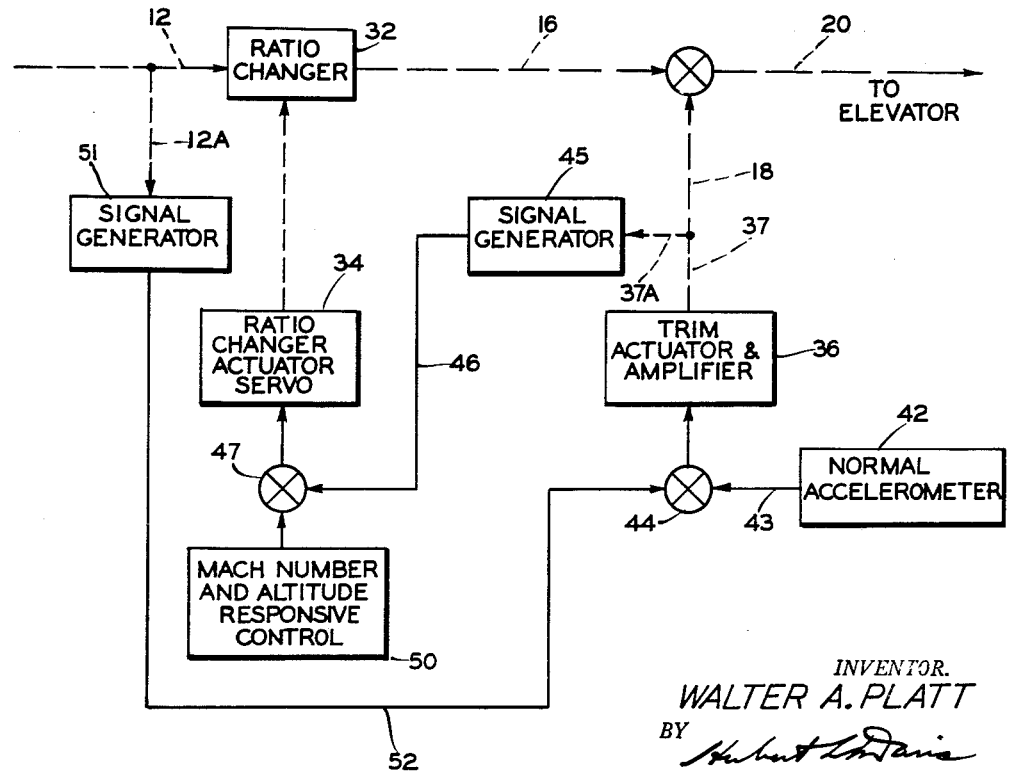
Figure 2 is a diagrammatic showing of the arrangement of the basic components of the closed loop ratio changer and automatic trim computer in which dotted lines indicate mechanical signal connections while solid lines indicate electrical signal connections.

As shown diagrammatically in Figure 2, the trim actuator 36 may include a conventional servo motor having a suitable electrical amplifier of conventional type in the electrical signal input thereto so as to be controlled by a normal accelerometer 42 mounted on the aircraft close to the center of gravity thereof and arranged to supply an electrical signal through conductor 43 and signal summing device 44 to the trim actuator 36 so as to effect the amount of trim necessary to correct for changes in the steady state characteristics of the plane, due for example to changes in airspeed, altitude, gross weight and shift in the center of gravity of the plane as upon consumption of fuel in the flight of the plane.

Thus, the normal accelerometer 42 is so arranged on the plane as to sense any change in "G" due to any of the above effects and generates an electrical signal which causes the trim actuator 36 to move the surfaces of the elevators in a proper sense to restore the plane to the desired one "G" flight condition.

As shown in Figure 2, there is further provided a signal generator 45 positioned by the trim actuator 36 through link 37 and 37A and so arranged as to cooperate with other mechanism, as hereinafter described, to compute the proper position of the ratio changer 32. The generator 45 is electrically connected through conductor 46 and signal summing device 47 to the ratio changer actuator 34. The signal supplied by the generator 45 is compared to a simple corrective signal effected as a function of Mach number and altitude and sensed by a suitable control device 50 which applies the corrective signal through the signal summing device 47 to the servo actuator 34 so that the resultant signal causes the servo actuator 34 to position the ratio changer 32 and linkage 14 to the proper value.

In the present invention, the simple corrective signal provided by the control device 50 while effected as a function of the altitude and Mach number of the aircraft prevailing at any given instant in the flight of the aircraft, would, of course, be of a value predetermined on the basis of the particular aerodynamic characteristics of the aircraft in which the control system may be designed for operation, so as to provide the required corrective function for such aircraft under the prevailing altitude and Mach number.

Thus for each given altitude and Mach number of the aircraft that may prevail during flight, there is effected by the device 50 an output signal of a predetermined value to effect the required corrective function for the particularly aerodynamic characteristics of the aircraft in which the control system is designed for operation. The device 50 may include conventional structure to effect the desired simple corrective signal, such as a pair of variable slidewire non-linear potentiometers electrically connected in summing relation and adjustably operated respectively by a suitable atmospheric pressure sensitive device and a total pressure sensitive device and in which arrangement the respective summing potentiometers may have electrical output signal characteristics so correlated to the aerodynamic characteristics of the aircraft and the pressure sensitive operating devices as to provide the required predetermined simple corrective signal applied by the control device 50 to the summing device 47 for the prevailing flight altitude and Mach number of the aircraft.

There is further provided an additional signal generator 51 operatively connected to the control lever 10 through linkage 12 and 12A and so arranged in the system that the pilot may command a maneuver of the airplane without upsetting the proper operation of the trim actuator 36. Thus, the output of the signal generator 51 is connected through an electrical conductor 52 and signal summing device 44 to the trim actuator 36 and combined with the signal from the normal accelerometer 42.

The signal from the signal generator 51 is dependent upon the displacement of the control stick 10 and is compared with the signal from the normal accelerometer 42 at the summing device 44 so as to provide a resultant signal which is fed to the trim actuator 36. The actuator 36 in response to the resultant signal positions the signal generator 45 to provide an electrical signal dependent upon the deflection of the trim actuator 36 in response to the signal resulting from the comparison of the control stick displacement and normal accelerometer signals. The signal from the signal generator 45 is in turn combined at the signal summing device 47 with the correction signal effected as a function of the prevailing flight condition of the aircraft as sensed by the Mach number and altitude responsive control 50 so as to provide a resultant signal from the summing device 47 which is applied to the actuator servo 34 to control the ratio changer 32.

In this connection, the signal applied to conductor 46 by the signal generator 45 is a measure of the deflection required to maintain the aircraft in normal or trim one "G" flight condition. This is also an approximate measure of the pitching sensitivity of the aircraft, i.e., the amount of changing elevator deflection required to give a unit change in normal acceleration. The degree of said approximation being a function of Mach number and altitude of the aircraft so that the corrective signal from the control device 50 is combined at the summing device 47 with the signal supplied by the generator 45 to the conductor 46 to obtain a more exact measurement or signal of the pitching sensitivity of the aircraft to control the ratio changer actuator servo 34.

Thus, for normal one "G" flight operation the accelerometer 42 may cause the trim actuator 36 to provide enough elevator deflection to trim the plane and when the pilot changes the position of the control stick 10 from a neutral position so as to perform a maneuver there will be effected enough elevator deflection through links 12, 14, 16, 18, 20 to perform the maneuver as measured by the normal accelerometer 42 and compared to the signal of the signal generator means 51 so that with proper operation of the system the two signals tend to balance out.

This system, or "computer," operates in the following fashion. Suppose, the control stick is at neutral. In this case the signal representing stick displacement is zero and since the signal indicating normal acceleration has previously been adjusted to be zero for straight and level flight—load factor equals unity—any deviation of the aircraft from straight and level flight not caused, or commanded, by control stick displacement will cause a signal to be developed by the normal accelerometer causing the trim actuator to run at a speed dependent on this signal and in such a direction as to reduce this signal through control of the aircraft. Thus, a closed loop is formed which will hold the aircraft flying at a load factor equal to unity as long as the stick is at neutral.

The ratio changer command signal is computed from the trim actuator displacement on the basis of the following equations:

$$R = \frac{\delta e}{g}(N_L - 1) \cong (N_L - 1)[\Delta et - f(M,h)]$$

where $R$ = ratio of output to input of ratio changer
$\delta e/g$ = incremental elevator required to give a unit increase in load factor
$N_L$ = limit load factor
$\Delta et$ = displacement of trim actuator
$f(M,h)$ = a correction signal which is predominantly a function of Mach No. and altitude Since the ratio changer position will be correct for trim flight, when a maneuver is desired and the stick is displaced from neutral, the stick electrical signal and the normal acceleration signal will subtract such that the trim actuator does not move for commanded maneuvers.

There is thus provided a novel computer system in which the elevator trim deflection is obtained by means of a closed loop operation so that, the accuracy of trim does not depend on the accuracy of measuring aircraft parameters. In addition since the trim actuator gives elevator trim, with a fairly simple correction the trim actuator displacement can be used to compute the required signal for the ratio changer.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A control system for an elevator surface of an aircraft; comprising a manually operable control, linkage means operated thereby for positioning the elevator surface, actuator means to operatively position a part of the linkage means for effectively trimming the position of the elevator surface, accelerometer means responsive to change in the condition of acceleration of the aircraft for generating a first electrical signal for controlling said trim actuator means so as to position the elevator surface in a sense to restore the aircraft to a predetermined condition of acceleration, means for adjusting another part of said linkage means so as to change the ratio of movement of the elevator surface to that of the manually operable control, means responsive to the prevailing Mach number and altitude of the aircraft for generating a second electrical signal, a signal device positioned by said trim actuator means for generating a third electrical signal, means for combining said second and third electrical signals to provide a resultant signal, and other actuator means responsive to said resultant signal for controlling said ratio changing means.

2. The combination defined by claim 1 including a signal device positioned by said manually operable control for generating a fourth electrical signal, means for combining said first and fourth electrical signals to provide a second resultant signal, and said trim actuator means operatively controlled by said second resultant signal.

3. Means for positioning a control surface of an aircraft, comprising manually operable means, means operatively connecting the manually operable means to the control surface, "G" responsive means, signal generator means operable by said manually operable means, actuator means for controlling said connecting means so as to trim the control surface, said actuator means being jointly controlled by said signal generator means and "G" responsive means so as to cause said connecting means to operate the control surface in a sense to maintain the "G" condition of the aircraft at a predetermined value, another signal generator means operatively controlled by said actuator means, other actuator means for operating the connecting means so as to change the ratio of movement of the manually operable means to that of the control surface, aircraft flight condition responsive means, means operatively connecting said other signal generator means and said flight condition responsive means so as to control said other actuator means, said other signal generator means and said flight condition responsive means cooperating in controlling said other actuator means so as to maintain the ratio of maximum travel of the control surface to the load factor of the aircraft substantially constant.

4. A control system for an elevator surface of an aircraft; comprising a control means, means operated thereby for positioning the elevator surface, actuator means for trimming the position of the elevator surface, accelerometer means responsive to change in the condition of acceleration of the aircraft for controlling said trim actuator means so as to position the elevator surface in a sense to restore the aircraft to a predetermined condition of acceleration, signal generator means operatively controlled by said actuator means, adjustably positioned means for changing the ratio of movement of the elevator surface to that of the control means, means responsive to prevailing atmospheric conditions in flight of the aircraft, actuator means for adjustably positioning said ratio changing means, and means operatively connecting said signal generator means and said atmospheric condition responsive means so as to jointly control the last-mentioned actuator means.

5. A control system for an elevator surface of an aircraft; comprising a control means, means to operatively connect the control means to the elevator surface, first actuator means for operating the connecting means to trim the position of the elevator surface, accelerometer means responsive to change in a "G" condition of the aircraft from a predetermined value for controlling said trim actuator means so as to position the elevator surface in a sense to restore the "G" condition of the aircraft to the predetermined value, signal generator means operative by the first actuator means, second actuator means for opearting the connecting means to change the ratio of movement of the elevator surface to that of the control means, means responsive to the prevailing airspeed of the aircraft, and means operatively connecting said airspeed responsive means and said signal generator means to said second actuator means so as to control said ratio changing means.

6. A control system for an elevator surface of an aircraft; comprising a control means, means to operatively connect the control means to the elevator surface, actuator means for automatically operating the connecting means to trim the position of the elevator surface, accelerometer means responsive to change in a "G" condition of the aircraft from a predetermined value for controlling said trim actuator means so as to position the elevator surface in a sense to restore the "G" condition of the aircraft to the predetermined value, signal generator means operative by said actuator means, other actuator means for automatically operating the connecting means to change the ratio of movement of the elevator surface to that of the control means, means responsive to the prevailing altitude of the aircraft, and means operatively connecting said altitude responsive means and said signal generator means so as to control said ratio changing actuator means.

7. A control system for an elevator surface of an aircraft; comprising a control means, means to operatively connect the control means to the elevator surface, actuator means for automatically operating the connecting means to trim the position of the elevator surface, accelerometer means responsive to change in a "G" condition of the aircraft from a predetermined value for controlling said trim actuator means so as to position the elevator surface in a sense to restore the "G" condition of the aircraft to the predetermined value, signal generator means controlled by said actuator means, other actuator means for automatically operating the connecting means to change the ratio of movement of the elevator surface to that of the control means, means responsive to the prevailing airspeed and altitude of the aircraft, and means operatively connecting said last-mentioned means and said signal generator means so as to jointly control said ratio changing actuator means.

8. A control system for an adjustable airfoil surface of an aircraft; comprising pilot operative control means, means operatively connecting the control means to the airfoil surface, said connecting means including ratio changing means operative to change the ratio of movement of the control means to that of the control surface, aircraft "G" responsive means for effecting a first control signal, other means responsive to said pilot operative control means for effecting a second control signal, means for comparing said first and second control signals for effecting a first resultant signal, actuator means controlled by said first resultant signal, means responsive to prevailing atmospheric conditions of flight of the aircraft for effecting a third signal, signal generator means operated by said actuator means for effecting a fourth signal, means operatively connecting said signal generator means and said flight condition responsive means so that said third and fourth signals may effect a second resultant signal to control said ratio changing means, said signal generator means and said flight condition responsive means cooperating so as to cause said ratio changing means controlled thereby to maintain the ratio of maximum travel of the airfoil surface to the load factor of the aircraft substantially constant.

References Cited in the file of this patent

UNITED STATES PATENTS

| 1,885,578 | Boykow | Nov. 1, 1932 |
|---|---|---|
| 1,897,285 | Veit | Feb. 14, 1933 |
| 2,092,424 | Potez | Sept. 7, 1937 |
| 2,205,610 | Van Nes | June 25, 1940 |
| 2,222,886 | Voigt | Nov. 26, 1940 |
| 2,356,339 | Morrison | Aug. 22, 1944 |
| 2,743,889 | White | May 1, 1956 |

FOREIGN PATENTS

| 862,649 | France | Dec. 6, 1940 |